United States Patent [19]

Hsieh

[11] 4,095,017

[45] June 13, 1978

[54] VINYL MONOMER POLYMERIZATION OR COPOLYMERIZATION CATALYZED BY ORGANOALUMINUM-ORGANOPHOS-PHINE-METAL SALT OF A BETA-DIKETONE CATALYST SYSTEM

[75] Inventor: Henry L. Hsieh, Bartlesville, Okla.

[73] Assignee: Phillips Petroleum Company, Bartlesville, Okla.

[21] Appl. No.: 761,081

[22] Filed: Jan. 21, 1977

Related U.S. Application Data

[62] Division of Ser. No. 577,137, May 13, 1975, Pat. No. 4,020,018, which is a division of Ser. No. 416,816, Nov. 19, 1973, Pat. No. 3,925,317.

[51] Int. Cl.$^2$ ................................................. C08F 4/52
[52] U.S. Cl. ................................ 526/188; 526/186; 526/187; 526/193; 526/189; 526/273; 526/328; 526/332; 526/72
[58] Field of Search ................. 526/186, 187, 188, 189

[56] References Cited

U.S. PATENT DOCUMENTS

| | | | |
|---|---|---|---|
| 2,924,589 | 2/1960 | Jurgeleit | 260/67 |
| 3,180,838 | 4/1965 | Chiang | 252/431 |
| 3,228,924 | 1/1966 | Childers | 260/94.3 |
| 3,437,649 | 4/1969 | Mueller | 260/94.7 |
| 3,459,688 | 8/1969 | Hsieh | 260/2 |
| 3,468,860 | 9/1969 | Hsieh | 260/88.3 |
| 3,496,247 | 2/1970 | Yuguchi et al. | 260/680 |
| 3,553,182 | 1/1971 | Mueller | 260/88.3 |

*Primary Examiner*—Harold D. Anderson
*Assistant Examiner*—E. A. Nielsen

[57] ABSTRACT

A catalyst system comprising (I) an organoaluminum compound, (II) an organophosphine compound, and (III) a metal salt of a beta-diketone, is effective to homopolymerize an alkene oxide, homopolymerize an ester of acrylic or methacrylic acid or certain other vinyl monomers, or to copolymerize an alkene oxide with an ester of acrylic or methacrylic acid or certain other vinyl monomers. Suitable vinyl monomers include vinyl esters, vinyl ethers, or vinyl ketones.

22 Claims, No Drawings

VINYL MONOMER POLYMERIZATION OR COPOLYMERIZATION CATALYZED BY ORGANOALUMINUM-ORGANOPHOSPHINE-METAL SALT OF A BETA-DIKETONE CATALYST SYSTEM

This application, and application Ser. No. 761,090 filed Jan. 21, 1977 herewith, are Divisional applications of Ser. No. 577,137 filed May 13, 1975, now U.S. Pat. No. 4,020,018 patented Apr 26, 1977, which is a Divisional application of Ser. No. 416,816, filed Nov. 19, 1973, now U.S. Pat. No. 3,925,317 patented Dec. 19, 1975.

FIELD OF THE INVENTION

The invention relates to an organoaluminum compound-organophosphine compound-metal salt of a beta-diketone catalyst system. The invention also relates to a method to homopolymerize an alkene oxide. In another aspect, the invention relates to a method to homopolymerize esters of acrylic or methacrylic acid, vinyl esters, vinyl ethers, or vinyl ketones. In a further aspect, the invention relates to a method to copolymerize an alkene oxide with an ester of acrylic or methacrylic acid or certain other vinyl monomers, e.g., vinyl esters, vinyl ethers, or vinyl ketones.

BACKGROUND OF THE INVENTION

A catalyst system consisting of an organoaluminum compound and an organophosphine has been used to copolymerize an alkene oxide with an acrylate. An organoaluminum compound with zinc acetylacetonate has been employed to polymerize an alkene oxide.

Needed, however, have been methods and catalyst systems to provide products of increased molecular weight and of higher inherent viscosity, to favor the formation of rubbery solids rather than viscous liquids, in the polymerization of alkene oxides, of vinyl monomers, or copolymers thereof. While viscous liquids, where reactive groups are available, may be transformed into solid products by crosslinking, it is oftentimes more desirable to obtain a high molecular weight polymer to start with, without crosslinking, since it is thus possible to obtain better processibility and more desirable physical properties such as tensile strength, degree of elongation, modulus, and the like.

OBJECTS OF THE INVENTION

It is an object of the invention to provide a catalyst system and a polymerization process effective to polymerize an alkene oxide, or an ester of acrylic or methacrylic acid or certain other vinyl monomers, e.g., vinyl esters, vinyl ethers, or vinyl ketones, or copolymerize an alkene oxide with an ester of acrylic or methacrylic acid or certain other vinyl monomers, e.g., vinyl esters, vinyl ethers, or vinyl ketones to solid polymeric products. It is a further object of the invention to provide processes, and catalyst systems, to produce rubbery solids from such polymerizations without the need for crosslinking.

Other objects, aspects, and advantages of the invention will be apparent from a study of the specification and the appended claims.

SUMMARY OF THE INVENTION

I have discovered that the catalyst system comprising (I) an organoaluminum compound, (II) an organophosphine compound, and (III) a metal-salt of a beta-diketone, is effective for the (a) homopolymerization of an alkene oxide, or (b) hompolymerization of an ester of acrylic or methacrylic acid or certain other vinyl monomers, e.g., vinyl esters, vinyl ethers, or vinyl ketones, or (c) copolymerization of an alkene oxide with an ester of acrylic or methacrylic acid or certain other vinyl monomers, e.g., vinyl esters, vinyl ethers, or vinyl ketones.

My catalyst system and process appear to favor the formation of rubbery solids rather than viscous liquids. The rubbery solids obtained by my process and catalyst system exhibit satisfactory physical properties without the necessity of crosslinking, though they can be vulcanized or cross-linked, if desired.

DETAILED DESCRIPTION OF THE INVENTION

Initiator Composition

The initiator system employed in the process of my invention comprises (I) an organoaluminum compound, (II) an organophosphine compound, and (III) a metal salt of a beta-diketone. A single component of each type can be employed, or two or more of any one component, or of each of the components.

Organoaluminum Compound

The organoaluminum compounds useful in my process are considered to include both the triorganoaluminum compounds and the organoaluminum hydrides. Such compounds can be represented by the general formula:

in which each R represents an aliphatic, cycloaliphatic, aromatic, or combination radical such as an aralkyl or alkaryl radical; $n$ is an integer of 1, 2, or 3; $m$ is 0 or an integer of 1 or 2; such that $n + m$ equals 3. The R groups in a single compound can be the same or different. The size of each R group is not limited as far as operability is concerned. From a standpoint of handling, solubility, and availability, I presently prefer those compounds in which the R group contains up to 20 carbon atoms per group.

Examples of suitable organoaluminum compounds are considered to include trimethylaluminum, triethylaluminum, tri-n-propylaluminum, triisopropylaluminum, tri-n-butylaluminum, triisobutylaluminum, triisoamylaluminum, tri-n-hexylaluminum, tri-n-octylaluminum, tri-n-dodecylaluminum, tricyclohexylaluminum, triphenylaluminum, tribenzylaluminum, trieicosylaluminum, diethyl-n-butylaluminum, tri-4-tolylaluminum, tri(2-hexyltetradecyl)aluminum, ethyldi(4-cyclohexyloctyl)aluminum, ethyldi(2-butylcyclohexyl)aluminum, tri(2,4,8-trimethylhendecyl)aluminum, isopropylaluminum dihydride, n-nonylaluminum dihydride, 4-methylcyclohexylaluminum dihydride, 2,4,6-triethylphenylaluminum dihydride, 3,5,7-tri-n-propylhendecylaluminum dihydride, diethylaluminum hydride, di(2,4,6-trimethylhexyl)aluminum hydride, methyl(benzyl)aluminum hydride, di-tert-butylaluminum hydride, dieicosylaluminum hydride, and the like, alone, or in admixture.

Organophosphine Compound

The organophosphine compounds employed in the process of my invention and in my catalyst system are considered to include the compounds classified as triorganophosphine compounds. These can be represented by the formula

, $R'_3P$.

In the above formula, R' represents an aliphatic, cycloaliphatic, aromatic, or combination radical such as alkaryl or aralkyl, either hydrocarbon and which also can be substituted with alkoxy substituents. Presently, for convenience, solubility, and availability, I prefer those triorganophosphine compounds in which the R' group contains up to 20 carbon atoms, though higher molecular weight groups can be employed where desired. Where alkoxy-substituted R' groups are contained, the alkoxy substituent or substituents can contain up to four carbon atoms per alkoxy group.

Examples of suitable triorganophosphine compounds are considered to include trimethylphosphine, triisopropylphosphine, tri-n-hexylphosphine, ethyldi-n-tridecylphosphine, trieicosylphosphine, methyl(dicyclopentyl)phosphine, triphenylphosphine, tribenzylphosphine, tri(4-methoxyphenyl)phosphine, tri(3,5-diethoxyphenyl)phosphine, tri(5-n-butoxypentyl)phosphine, and the like, alone, or in admixture.

Metal Salt of a Beta-diketone

The metal salt of a beta-diketone, presently preferably of acetylacetone is considered to include the appropriate beta-diketone salts wherein the metal is selected from the group consisting of beryllium, magnesium, calcium, strontium, barium, boron, aluminum, gallium, indium, thallium, germanium, tin, lead, zinc, cadmium, and mercury. Of these, the zinc presently is preferred for its reactivity, and most preferably for availability and reactivity the zinc salt of acetylacetone.

The metal salt of the beta-diketone can be represented by the generic formula:

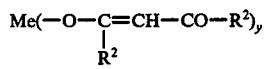

in which Me represents one of the aforesaid metals. Each $R^2$ represents a hydrocarbon radical which is saturated aliphatic, saturated cycloaliphatic, or aromatic, and y is an integer which is equal to the valence of the metal Me. Cf. Moeller, *Inorganic Chemistry* 241 (Wiley and Sons, 1952).

Presently preferred are those metal salts of the beta-diketone wherein $R^2$ contains up to 10 carbon atoms per molecule for convenience and solubility. Each $R^2$ relative to the other $R^2$ in the generic formula can be the same, or can differ. Mixtures of different beta-diketones can be employed, as can mixtures of differing metal salts of the same beta-diketone. It is not necessary that the beta-diketone be employed solely and completely as the metal salt, but substantially all should be present as metal salt.

Exemplary of the beta-diketones which can combine with any of the metals described to form the corresponding metal salt, I consider to include 2,4-pentanedione(acetylacetone); 3,5-heptanedione; 11,13-tricosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n-butylphenyl)-1,3-propanedione; 1,11-diphenyl-5,7-hendecanedione; 1-phenyl-1,3-butanedione; 2,4-decanedione; and 1-(3,5-demethylcyclohexyl)-2,4-pentanedione, and the like, alone, as well as mixtures.

Initiator Ratios

The mole ratio of organoaluminum compounds to triorganophosphine compounds, the mole ratio of the organoaluminum compound to the metal salt of the beta-diketone, and the ratio of each of the three components one to the other can range widely, so long as the relative mole ratio of I:II:III each to the other is sufficient to provide initiator effectiveness in the polymerization system in which the combination initiator is to be employed.

Presently I prefer, for purposes of reactivity and to achieve desired levels of inherent viscosity in the polymerized monomers, to employ a mole ratio of organoaluminum compound to triorganophosphine in the range of about 1:1 to 20:1, presently preferably for particularly good results in the range of about 1:1 to 10:1. For similar reasons, I presently prefer to employ a mole ratio of organoaluminum compound to the metal salt of the beta-diketone within the range of 2:1 to 100:1, more preferably in the range of about 3:1 to about 30:1.

As to the amount of catalyst system to be employed, based on the amount of monomer to be polymerized, this can be conveniently based on the amount or organoaluminum compound employed in the catalyst system. The amount of catalyst system employed can range widely, so long as a sufficient amount is employed to effect the polymerization desired to the degree desired. However, for most purposes, I would consider an amount of catalyst system to be employed for exemplary purposes to be in the range of about 1 to 100 gram millimoles of organoaluminum compound per 100 grams of monomer being polymerized, with presently particularly good results having been found in the range of about 5 to 40 gram millimoles of organoaluminum compound per 100 grams of monomer. By monomer is meant the total amount of all monomers being polymerized. The other initiator components thus can be based on the amount of organoaluminum compound to maintain the mole ratios as previously discussed.

The catalyst system can be prepared by mixing the three components, one or more of each of the three components, and charging the resulting admixture to the reactor. Alternatively, the catalyst components can be charged to the reactor directly. Or, where desired, or convenient, any two of the components can be admixed for feeding, and the third component added directly to the reactor.

Monomers

The process of my invention and the catalyst system of my invention are applicable to (A) homopolymerization of alkene oxides, (B) homopolymerization of esters of acrylic or methacrylic acid or certain other vinyl monomers, and (C) the copolymerization of alkene oxides with esters of acrylic or methacrylic acid with other vinyl-containing monomers.

Alkene Oxide

Polymerizable alkene oxides can be employed in the process of my invention. Presently preferred for availability and reactivity are those alkene oxides of up to 20 carbon atoms per molecule. The alkene oxides further can be represented by:

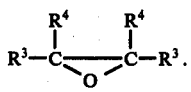

In the above alkene oxide generic formula, each of the $R^3$ and $R^4$ groups is individually selected from hydrogen, or from a saturated aliphatic or saturated cycloaliphatic, a monoolefinic aliphatic, diolefinic aliphatic, which can be conjugated or nonconjugated, monoolefinic cycloaliphatic, diolefinic cycloaliphatic, which can be conjugated or nonconjugated, or an armoatic radical, or combination radical including aralkyl, alkaryl, and the like, such that, preferably at least, the molecular will contain up to 20 carbon atoms.

Some or all of the $R^3$ and $R^4$ radicals can be halogen-substituted, and/or can contain oxygen in the form of an acyclic ether linkage (—O—) or as another oxirane group

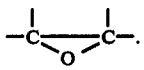

As further characterization, the alkene oxides as described above can contain 1 or 2 olefinic linkages, 1 or 2 oxirane groups, and up to 1 ether linkage. Further, the $R^4$ radicals together can represent a divalent aliphatic hydrocarbon radical which, together with the carbon atoms of the oxirane group, can form a cycloaliphatic hydrocarbon nucleus containing up to 10 carbon atoms.

Examples of alkene oxides which I consider can be homopolymerized or copolymerized according to the process and the catalyst system of my invention include ethylene oxide (epoxyethane); 1,2-epoxypropane (propylene oxide); 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1-bromo-2,3-epoxypropane; 1,5-dichloro-2,3-epoxypentane; 3-iodo-1,2-epoxybutane; styrene oxide; 6-oxabicyclo(3.1.0)hexane; 7-oxabicyclo(4.1.0)heptane; 3-n-propyl-7-oxabicyclo(4.1.0)heptane; bis(2,3-epoxybutyl) ether; tert-butyl 4,5-epoxyhexyl ether; and 2-phenylethyl 3,4-epoxybutyl ether, and the like, including mixtures.

Examples of unsaturated alkene oxides which I consider can be employed in my invention include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3:7,8-diepoxyoctyl ether; 6-phenyl-3-hexenyl 3-ethyl-5,6-epoxyhexyl ether; 3,4-epoxy-1-butene (butadiene monoxide); 3,4-epoxy-1-pentene; 5-phenyl-3,4-epoxy-1-pentene; 1,2:9,10-diepoxy-5-decene; 6,7-di-n-butyl-3,4,9,10-diepoxy-1,11-dodecadiene; epoxyethyl vinyl ether; allyl 2-methyl-2,3-epoxypropyl ether; 3-cyclohexyl-2-propenyl 4-cyclohexyl-3,4-epoxybutyl ether; 2,4-pentadienyl 2,3-diethyl-3,4-epoxybutyl ether; 1-methallyl 6-phenyl-3,4-epoxyhexyl ether; 5-(4-tolyl)2,3-epoxypentyl vinyl ether; bis[4-(3-cyclopentenyl)2,3-epoxybutyl] ether; 2-(2,4-cyclohexadienyl)ethyl 2,3-epoxybutyl ether; 2-(2,5-cyclohexadienyl)ethyl 2-benzyl-4,5-epoxypentyl ether; 3,4-epoxy-1,5-hexadienyl isopropyl ether; allyl 3,4-dimethyl-3,4-epoxyhexyl ether; 3,4-epoxy-4-(2,3-dimethylphenyl)-1-butene; 3,4-dimethyl-3,4-epoxy-1-pentene; 5-(4-methylcyclohexyl)-3,4-epoxy-1-pentene; 4,5-diethyl-4,5-epoxy-2,6-octadiene; 4-(2,4-cyclopentadienyl)-1,2,6,7-diepoxyheptane; and 1-phenyl-1,2-epoxy-5,7-octadiene, and the like, including mixtures.

Vinyl Monomers

The term vinyl monomers is here employed by me to include vinyl esters, vinyl ethers, and vinyl ketones. The esters of acrylic or of methacrylic acid are preferred vinyl monomers. Vinyl monomers which I consider can be employed in the process of my invention employing the catalyst system of my invention can be represented by

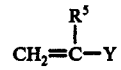

in which R is hydrogen or an alkyl, aryl, alkaryl or aralkyl radical containing from 1 to 8 carbon atoms and Y is selected from

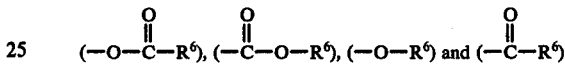

wherein $R^6$ is an alkyl, aryl, alkaryl or aralkyl radical containing from 1 to 20 carbon atoms.

Examples of such vinyl monomers I consider to include methyl acrylate; ethyl acrylate; n-butyl acrylate; methyl methacrylate; isopropyl methacrylate; methyl vinyl ketone; n-hexyl vinyl ketone; methyl vinyl ether; tert-butyl vinyl ether; eicosyl acrylate; eicosyl vinyl ketone; eicosyl vinyl ether; vinyl heneicosanoate; vinyl acetate; vinyl benzoate; vinyl phenylacetate; vinyl 3,5-diheptylbenzoate; 2-phenylbutyl vinyl ketone; 1-naphthyl vinyl ketone; methyl 2-octylacrylate; methyl 2-benzylacrylate; methyl 2-(p-tolyl)-acrylate; eicosyl 2-octylacrylate; eicosyl methacrylate; benzyl methacrylate; 4-ethylphenyl methacrylate; phenyl methacrylate; 3-butylphenyl vinyl ketone; phenyl vinyl ether; benzyl vinyl ether; 3,5-diheptylphenyl vinyl ether; 4,6-dipentyl-2-naphthyl vinyl ether; and the like, alone, or in admixture.

The amount of vinyl monomer or monomers so employed preferably is in the range of 0 to 60 parts by weight per 100 parts of total monomer.

Polymerization Process

The polymerization process can be conducted either as a batch or continuous process, with the catalyst being added as a single initial charge, in increments during the course of the polymerization, or prepared in situ.

The monomer charge can be introduced into the reaction zone as a single charge, or fed gradually or incrementally during the course of the polymerization.

It is presently preferred, for maximum efficiency of polymerization reaction, that the reaction be conducted in the presence of diluent, preferably inert with respect to monomer and catalyst system, e.g., does not interfere with desired reaction. Diluents include paraffinic, cycloparaffinic, aromatic hydrocarbons, or combination types, such as those of 4 to 10 carbon atoms per molecule. Exemplary diluents include butane, pentane, hexane, decane, cyclopentane, cyclohexane, methylcyclohexane, benzene, toluene, xylene, ethylbenzene, and the like, including mixtures. Halogenated hydrocarbons can be employed, if desired, alone, or in admixture with the hydrocarbons, and include any of the compounds just enumerated containing halogen, such as chlorobenzene, and the like, including mixtures.

Since the actual diluent employed is largely a matter of choice, it is feasible to employ other diluents other than those specifically enumerated herein without departing from the scope and spirit of the invention. However, ethers and the like are not suggested, since tending to cut conversion.

The temperatures and the pressures at which the polymerization reaction of my invention is conducted I consider can vary over a rather wide range. Expediently, the reaction is conducted at temperatures within the range of about −50° F. to +250° F., presently preferably in the range of about −25° F. to +175° F., being conducted for best results at pressures suitable and sufficient to maintain the reactant and diluents, where used, in substantially the liquid phase. Pressures can include superatmospheric pressures upwards of several thousand pounds per square inch, if desired.

The duration of the polymerization reaction depends upon temperatures, pressure, reactivity of the particular initiator system employed, as well as convenience, whether monomers and/or initiators are being fed initially or intermittently, and as well as amounts and materials employed. Exemplary polymerization times range from an interval of about 5 minutes to about 100 hours or more. The presently preferred range for best results is about 10 minutes to about 50 hours.

Various substances detrimental to the process of the invention should be excluded, including carbon dioxide, molecular oxygen, including air, water, or other moisture, and the like. Where desirable, or necessary, reactants, diluents, where used, should be substantially freed of such materials as well as of any other material which may tend to inactivate the catalyst or otherwise interfere with the polymerization. Thus, it is desirable to remove air and moisture from the reactor in which the polymerization is to be conducted, such as by flushing with a dry inert gas such as nitrogen.

Termination of the polymerization reaction, removal of catalyst, removal of polymer, and the like, can be carried out in conventional manner. Upon completion of the polymerization, the reaction mixture can be treated to inactivate the catalyst and to remove the polymer. One suitable method for accomplishing such objectives involves steam stripping of diluent from the reaction mass. Another method involves addition of a catalyst inactivating material, such as a lower alcohol such as isopropyl alcohol, adding to the mixture so as to inactivate the catalyst and precipitate the polymer. The polymeric product then can be separated from the alcohol and diluent by any suitable means, including decantation, filtration, and the like.

Suitable additives known to the polymer art such as antioxidants, stabilizers, pigments, and the like, can be added to the product of the instant invention. It frequently is advantageous to add an antioxidant, such as 2,6-di-t-butyl-4-methylphenol, or the like, to the polymer solution itself prior to recovery of the polymer, to gain uniform admixing and protection in this manner.

Where desired, the polymers made in accordance with the invention, can be cured, i.e., crosslinked, in several ways. If a halogenated monomer was employed, such as epichlorohydrin, curing reactions can be utilized that involve the halogen atoms and polymer. Or, where a reactant contained a carbon-carbon double bond, such as allyl glycidyl ether, the unsaturation present in the resulting polymer also can be utilized, such as by utilizing sulfur based cure methods.

EXAMPLES

Examples following are intended to assist in illustrating the effectiveness of my invention. Particular species employed, amounts used, polymers produced, should be considered as illustrative, not as limitative of the reasonable scope of the invention.

EXAMPLE I

Runs were made polymerizing monomers according to the process of my invention employing the catalyst system of my invention. The recipe employed was as follows:

| | |
|---|---|
| Toluene (diluent) | 430 phm[a] |
| Epichlorohydrin (ECH) | variable |
| Ethyl Acrylate (EA) | variable |
| Triisobutylaluminum (TIBA) | 30 mhm[b] |
| Triphenylphosphine (Ph$_3$P) | variable |
| Zinc acetylacetonate [Zn(AcAc)$_2$] | variable |
| Polymerization temperature | 41° F. |
| Polymerization period | 18 hours |
| Charge Order | |
| Toluene, Epichlorohydrin, | |
| Ethyl acrylate, | |
| Triphenylphosphine, | |
| Zinc acetylacetonate, | |
| Triisobutylaluminum | |

[a]parts by weight per 100 parts by weight of monomer
[b]gram millimoles per 100 grams of monomer The polymerizations were carried out under nitrogen in closed reaction containers employing anhydrous reactions and conditions. The reactors were charged in the order indicated, tumbled in a constant temperature bath for the stipulated polymerization intervals. The polymers were isolated by addition of the polymerization reaction mixture, after polymerization time, to isopropyl alcohol so as to deactivate the catalyst, following this by evaporation of the alcoholic mixture to dryness. Results obtained were as follows:

TABLE I

| Run No. | ECH phm | EA phm | TIBA mhm | Ph$_3$P mhm | Zn(AcAc)$_2$ mhm |
|---|---|---|---|---|---|
| 1 | 100 | 0 | 30 | 10 | 0 |
| 2 | 100 | 0 | 30 | 0 | 5 |
| 3 | 100 | 0 | 30 | 10 | 5 |
| 4 | 0 | 100 | 30 | 10 | 0 |
| 5 | 0 | 100 | 30 | 0 | 5 |
| 6 | 0 | 100 | 30 | 10 | 5 |
| 7 | 70 | 30 | 30 | 10 | 0 |
| 8 | 70 | 30 | 30 | 0 | 5 |
| 9 | 70 | 30 | 30 | 10 | 5 |
| 10 | 70 | 30 | 30 | 0 | 0 |

| Run No. | Conversion Wt. % | IV[c] | Insol. in THF Wt. % | ECH Wt. % in Polymer[e] |
|---|---|---|---|---|
| 1 | 99 | 0.28 | 2 | —[d] |
| 2 | 5 | — | — | — |
| 3 | 100 | 0.56 | 10 | — |
| 4 | 70 | 0.14 | 5 | — |
| 5 | 1 | — | — | — |
| 6 | 65 | 0.17 | 4 | — |
| 7 | 100 | 0.14 | 0 | 58 |
| 8 | 3 | — | — | — |
| 9 | 33 | 0.10 | 9 | 42 |
| 10 | 1 | — | — | — |

[e]Determined by chlorine analysis.
[d]A dash denotes no determination was made.
[c]Inherent viscosity determined in tetrahydrofuran by the process as shown in U.S. 3,278,508, column 20, note a.

Polymeric products produced in Runs 1 through 10, inclusive, range from viscous liquids to soft rubbers. The results illustrate the polymerization of an alkene oxide alone, an acrylate alone, and copolymerization of an alkene oxide with an acrylate. Runs 3, 6, and 9 were run according to the invention. Runs 3 and 6 illustrate the generally high inherent viscosity with high conversion obtainable by my invention.

Comparing control Run 1 with invention Run 3 wherein an alkene oxide homopolymerization was involved, with Run 3 of invention further adding the zinc acetylacetonate, it is observed that the addition of third component of the catalyst system results in a higher inherent viscosity. Comparison of control Run 4 with inventive Run 6 for a homopolymerization of an acrylate, leads to the same conclusion, showing higher inherent viscosity value than was possible without the specific catalyst system.

Comparing control Run 2 with inventive Run 3, an alkene oxide homopolymerization, is shown that it is my catalyst combination that is effective, that the organoaluminum compound and zinc acetylacetonate alone were not nearly as effective.

Control Run 5 as opposed to inventive Run 6, and control Run 8 as opposed to inventive Run 9, respective pairs illustrating homopolymerization of an acrylate and copolymerization of alkene oxide with acrylate, confirm the superiority of the inventive catalyst system.

Run 9, a run of the invention, appears to show relatively low conversion, and is anomalous in view of other runs which show a definite increase in inherent viscosity as a result of employing the inventive catalyst system under copolymerization conditions.

EXAMPLE II

Further runs were made for the copolymerization of an alkene oxide with an acrylate, employing various levels of metal salt of the beta-diketone. The recipe employed was as follows:

| Recipe | |
|---|---|
| Toluene | 430 phm |
| Epichlorohydrin | variable |
| Methyl methacrylate (MMA) | variable |
| Triisobutylaluminum | 30 mhm |
| Triphenylphosphine | 7 mhm |
| Zinc acetylacetonate | variable |
| Polymerization temperature | 41° F. |
| Polymerization period | 16 hours |
| Charge Order | |
| Toluene, Epichlorohydrin, | |
| Methyl methacrylate, | |
| Triisobutylaluminum, | |
| Zinc acetylacetonate, | |
| Triphenylphosphine | |

Otherwise, the general method of polymerization described in Example I was followed. Following polymerization, the catalyst was deactivated by addition of a solution of 1 phm of 2,6-di-t-butyl-4-methylphenol in a 50/50 toluene/isopropyl alcohol mixture followed by evaporation of the product mixture to dryness. Polymeric product of Runs 11 through 18 range from viscous liquids to soft rubbers. Results obtained are shown in Table II.

TABLE II

| Run No. | ECH phm | MMA phm | Zn(AcAc)$_2$ mhm | Conversion Wt. % | I.V. | Insol. in THF Wt. % | $M_w \times 10^{-3f}$ | $M_n \times 10^{-3f}$ | HI$^g$ | Chlorine Wt. % in Polymer | ECH Wt. % in Polymer[a] |
|---|---|---|---|---|---|---|---|---|---|---|---|
| 11 | 80 | 20 | 0 | 97 | 0.26 | 5 | 58 | 19 | 3.1 | 31.3 | 81.5 |
| 12 | 80 | 20 | 1 | 96 | 0.41 | 4 | 76 | 17 | 4.4 | 30.9 | 80.5 |
| 13 | 80 | 20 | 2 | 95 | 0.57 | 4 | 117 | 18 | 6.4 | 31.7 | 82.7 |
| 14 | 80 | 20 | 4 | 88 | 1.20 | 14 | 474 | 22 | 21 | 32.2 | 83.9 |
| 15 | 60 | 40 | 0 | 90 | 0.23 | 6 | 43 | 11 | 3.8 | 24.9 | 64.8 |
| 16 | 60 | 40 | 1 | 85.5 | 0.32 | 4 | 25 | 6.8 | 3.6 | 26.3 | 68.5 |
| 17 | 60 | 40 | 2 | 81 | 0.49 | 7 | 106 | 9.4 | 11 | 26.8 | 69.8 |
| 18 | 60 | 40 | 4 | 74 | 0.96 | 12 | 299 | 11 | 27 | 28.1 | 73.2 |

[a]Calculated from chlorine analysis.$^f M_w$, weight average molecular weight and $M_n$, number average molecular weight, were determined by gel permeation chromatography in accordance with the method of Kraus, G. and Stacy, C. J., 10 J. Poly. Sci., A-2, 657 (1972).$^g$Heterogeneity index is the quotient obtained by dividing the weight average molecular weight by the number average molecular weight.

Molecular weight data as shown in Table II above reflect a rise in molecular weight, inherent viscosity, with increasing zinc acetylacetonate levels in the catalyst system in accordance with my invention. Runs 11 and 15 excluded the zinc acetylacetonate component. In an 80/20 ratio of ECH/MMA, the addition of an increasing amount of zinc acetylacetonate resulted in sharp dramatic increases in inherent viscosity. Similar results were obtained on a 60/40 ECH/MMA copolymerization.

EXAMPLE III

Further runs were made employing zinc acetylacetonate at a level intermediate to those employed in Example II above, applying to both epichlorohydrin homopolymerization, as well as epichlorohydrin/methyl methacrylate copolymerizations. The recipe described in Example II was followed, except that a polymerization interval of 18 hours was employed. Following polymerization, residual catalyst was deactivated by addition of acetic acid to the reaction mixture. The polymers were isolated by steam stripping of volatiles, and the resulting polymeric material oven dried under reduced pressure. Polymeric product of Runs 19 through 22 range from viscous liquids to soft rubbers. Results are shown in Table III.

TABLE III

| Run No. | ECH phm | MMA phm | Zn(AcAc)$_2$ mhm |
|---|---|---|---|
| 19 | 100 | 0 | 0 |
| 20 | 100 | 0 | 3 |
| 21 | 80 | 20 | 0 |
| 22 | 80 | 20 | 3 |

| Run No. | Conversion Wt. % | I.V. | Insol. in THF Wt. % | Chlorine Wt. % in Polymer | ECH Wt. % in Polymer |
|---|---|---|---|---|---|
| 19 | 100 | 0.36 | 0 | — | — |
| 20 | 93 | 0.63 | 0 | — | — |
| 21 | 87 | 0.30 | 0 | 34.3 | 89.4 |
| 22 | 86 | 0.88 | 0 | 34.8 | 90.7 |

It can be observed by comparing control Run 19 with run of the invention 20, and also comparing control Run 21 with run of the invention 22, that the inclusion of zinc acetylacetonate in the catalyst system distinctly increases inherent viscosity of the resulting polymer.

The products produced according to this invention I consider can be varied, depending on the monomer or monomers employed and the amount of catalyst, from liquids to solids. Solid polymers produced in accordance with this invention are rubbery and are expected to exhibit good low temperature flexibility and resistance to the effects of the heat and ozone. These polymers should be readily vulcanizable with crosslinking agents, such as polyamines, to produce products which are expected to be resistant to swelling in hydrocarbons and chlorinated hydrocarbons. These rubbery polymers should have good building tack and exhibit low heat build-up on flexing so as to have utility in the specialty rubber field such as for fabricating articles like motor mounts, auto body mounts, auto suspension system parts, hoses, tubing, and the like.

The examples, the knowledge and background in the field of the invention, together with general principles of chemistry and other applicable sciences, have formed the bases for the broad descriptions of the invention including the ranges of conditions and generic groups of operant components and for my claims here appended.

I claim:

1. A process for the polymerization of at least one vinyl monomer selected from the group consisting of vinyl esters, vinyl ethers, and vinyl ketones, represented by

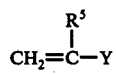

wherein $R^5$ represents hydrogen or an alkyl, aryl, alkaryl, or aralkyl, radical containing up to 8 carbon atoms, and Y is

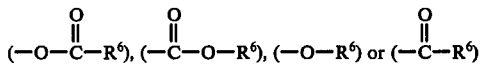

wherein $R^6$ represents an alkyl, aryl, alkaryl, or aralkyl, radical containing up to 20 carbon atoms under polymerization conditions, employing a catalyst system comprising (I) a hydrocarbon aluminum compound $R_nAlH_m$ wherein each R is a hydrocarbon radical, $n$ is an integer of 1 to 3, inclusive, and $m$ is 0 or an integer of 1 or 2, such that $n + m$ equals 3, (II) a triorganophosphine compound $R'_3P$ wherein R' is hydrocarbon or alkoxy-substituted hydrocarbon, and (III) a beta-diketone substantially as the metal salt of said beta-diketone, in catalytically effective ratios, wherein said metal of said (III) is beryllium, magnesium calcium, strontium, barium, boron, aluminum, gallium, indium, thallium, germanium, tin, lead, zinc, cadmium, or mercury.

2. A process according to claim 1 wherein in said hydrocarbon aluminum compound $R_nAlH_m$ each R is an aliphatic, cycloaliphatic, aromatic, or combination, radical.

3. The process according to claim 2, wherein said organoaluminum compound is trimethylaluminum, triethylaluminum, tri-n-propylaluminum, triisopropylaluminum, tri-n-butylaluminum, triisobutylaluminum, triisoamylaluminum, tri-n-hexylaluminum, tri-n-octylaluminum, tri-n-dodecylaluminum, tricyclohexylaluminum, triphenylaluminum, tribenzylaluminum, trieicosylaluminum, diethyl-n-butylaluminum, tri-4-tolylaluminum, tri(2-hexyltetradecyl)aluminum, methyldi(4-cyclohexyloctyl)aluminum, ethyldi(2-butylcyclohexyl)aluminum, tri(2,4,8-trimethylhendecyl)aluminum, isopropylaluminum dihydride, n-nonaluminum dihydride, 4-methylcyclohexylaluminum dihydride, 2,4,6-triethylphenylaluminum dihydride, 3,5,7-tri-n-propylhendecylaluminum dihydride, diethylaluminum hydride, di(2,4,6-trimethylhexyl)aluminum hydride, methyl(benzyl)aluminum hydride, di-tert-butylaluminum hydride, or dieicosylaluminum hydride.

4. The process according to claim 1 wherein in said triorganophosphine compound $R'_3P$ each R' is an aliphatic, cycloaliphatic, aromatic, or combination, radical.

5. The process according to claim 4 wherein said R' contains up to 20 carbon atoms, and where R' is alkoxy-substituted, the alkoxy groups thereof can contain up to 4 carbon atoms per alkoxy group.

6. The process according to claim 5 wherein said organophosphine compound is trimethylphosphine, triisopropylphosphine, tri-n-hexylphosphine, ethyldi-n-tridecylphosphine, trieicosylphosphine, methyl(dicyclopentyl)phosphine, triphenylphosphine, tribenzylphosphine, tri(4-methoxyphenyl)phosphine, tri(3,5-diethoxyphenyl)phosphine, or tri(5-n-butoxypentyl)phosphine.

7. The process according to claim 1 wherein said metal salt of a beta-diketone is represented by

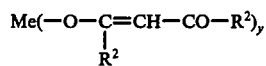

wherein Me is said metal; each $R^2$ is hydrocarbon and is a saturated aliphatic, saturated cycloaliphatic, or aromatic radical; any $y$ is an integer equal to the valence of the metal Me.

8. The process according to claim 7 wherein the beta-diketone of said metal salt of a beta-diketone is acetylacetone; 3,5-heptanedione; 11,13-tricosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n-butylphenyl)-1,3-propanedione; 1,11-diphenyl-5,7-hendecanedione; 1-phenyl-1,3-butanedione; 2,4-decanedione; or 1-(3,5-dimethylcyclohexyl)-2,3-pentanedione.

9. The process according to claim 1 wherein said vinyl monomer is a vinyl ester.

10. The process according to claim 1 wherein said vinyl monomer is a vinyl ether.

11. The process according to claim 1 wherein said vinyl monomer is a vinyl ketone.

12. The process according to claim 1 wherein said process employs about 1 to 100 gram millimoles of organoaluminum compound per 100 grams of monomer, a mole ratio of organoaluminum compound:triorganophosphine compound of about 1:1 to 20:1, and a mole ratio of organoaluminum compound:metal salt of a beta-diketone of about 2:1 to 100:1.

13. The process according to claim 12 wherein said process employs about 5 to 40 gram millimoles of organoaluminum compound per 100 grams of monomer, a mole ratio of organoaluminum compound:triorganophosphine compound of about 1:1 to 10:1, and a mole ratio of organoaluminum compound:metal salt of a beta-diketone of about 3:1 to about 30:1.

14. The process according to claim 13 wherein said polymerization is conducted in the presence of a paraffinic, cycloparaffinic, or aromatic diluent containing up to 10 carbon atoms per molecule.

15. The process according to claim 14 wherein said diluent is butane, pentane, hexane, decane, cyclopentane, cyclohexane, methylcyclohexane, benzene, toluene, xylene, ethylbenzene, or halogenated derivative thereof.

16. The process according to claim 15 wherein said polymerization reaction is conducted at a temperature in the range of about −50° to 250° F. under pressure sufficient to maintain reactants substantially in the liquid phase for a time sufficient to effectuate polymerization and wherein said metal of said metal salt of a beta-diketone is said zinc.

17. The process according to claim 16 wherein said catalyst consists essentially of triisobutylaluminum, triphenylphosphine, and zinc acetylacetonate, and said vinyl monomer is an ester of acrylic or of methacrylic acid.

18. The process for the polymerization of at least one vinyl monomer selected from the group consisting of vinyl esters, vinyl ethers, and vinyl ketones, under polymerization conditions, employing a catalyst system consisting essentially of
(I) hydrocarbon aluminum compound $R_nAlH_m$ wherein each R is a hydrocarbon radical, $n$ is an integer of 1 to 3, inclusive, and $m$ is 0 or an integer of 1 or 2, such that $n + m$ equals 3, (II) triorganophosphine compound $R'_3P$ wherein R' is hydrocarbon or alkoxy-substituted hydrocarbon, and (III) a beta-diketone substantially as the metal salt of said beta-diketone, in catalytically effective ratios, wherein said metal of said (III) is beryllium, magnesium, calcium, strontium, barium, boron, aluminum, gallium, indium, thallium, germanium, tin, lead, zinc, cadmium, or mercury;

and wherein said vinyl monomer is represented by

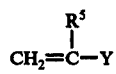

wherein $R^5$ represents hydrogen or an alkyl, aryl, alkaryl, or aralkyl, radical containing up to 8 carbon atoms, and Y is

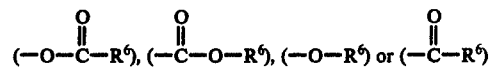

wherein $R^6$ represents an alkyl, aryl, alkaryl, or aralkyl, radical containing up to 20 carbon atoms.

19. The process according to claim 18 wherein said vinyl monomer is methyl acrylate; ethyl acrylate; n-butyl acrylate; methyl methacrylate; isopropyl methacrylate; methyl vinyl ketone; n-hexyl vinyl ketone; methyl vinyl ether; tert-butyl vinyl ether; eicosyl acrylate; eicosyl vinyl ketone; eicosyl vinyl ether; vinyl heneicosanoate; vinyl acetate; vinyl benzoate; vinyl phenylacetate; vinyl 3,5-diheptylbenzoate; 2-phenylbutyl vinyl ketone; 1-naphthyl vinyl ketone; methyl 2-octylacrylate; methyl 2-benzylacrylate; methyl 2-(p-tolyl)acrylate; eicosyl 2-octylacrylate; eicosyl methacrylate; benzyl methacrylate; 4-ethylphenyl methacrylate; phenyl methacrylate; 3-butylphenyl vinyl ketone; phenyl vinyl ether; benzyl vinyl ether; 3,5-diheptylphenyl vinyl ether; or 4,6-dipentyl-2-naphthyl vinyl ether.

20. The process according to claim 19 wherein said vinyl monomer is methyl methacrylate, and said catalyst consists essentially of triisobutylaluminum, triphenylphosphine, and zinc acetylacetonate.

21. The process according to claim 19 wherein said vinyl monomer is ethyl acrylate, and said catalyst consists essentially of triisobutylaluminum, triphenylphosphine, and zinc acetylacetonate.

22. A process for polymerization of an alkyl ester of acrylic or methacrylic acid, under polymerization conditions, employing a catalyst system consisting essentially of triisobutylaluminum, triphenylphosphine and zinc acetylacetonate, in catalytically effective ratios, wherein said process employs about 5 to 40 gram millimoles of triisobutylaluminum per 100 grams of epichlorohydrin, a mole ratio of triisobutylaluminum:triphenylphosphine of about 3:1 to 5:1, and a mole ratio of triisobutylaluminum:zinc acetylacetonate of about 6:1 to 30:1 and wherein said polymerization conditions include polymerization in a hydrocarbon diluent at a temperature in the range of about −25° F. to +175° F., at a pressure sufficient to maintain substantially liquid phase conditions, for a time of several hours.

* * * * *